United States Patent
Iwatsu

(10) Patent No.: US 7,308,461 B2
(45) Date of Patent: Dec. 11, 2007

(54) INFORMATION PROCESSING METHOD, APPARATUS, PROGRAM AND RECORDING MEDIUM

(75) Inventor: Takeshi Iwatsu, Kanagawa (JP)

(73) Assignee: Sony Corporation (JP)

( * ) Notice: Subject to any disclaimer, the term of this patent is extended or adjusted under 35 U.S.C. 154(b) by 516 days.

(21) Appl. No.: 10/817,637

(22) Filed: Apr. 2, 2004

(65) Prior Publication Data

US 2004/0243625 A1 Dec. 2, 2004

(30) Foreign Application Priority Data

Apr. 24, 2003 (JP) .......................... P2003-119948

(51) Int. Cl.
*G06F 17/00* (2006.01)
(52) U.S. Cl. .................. 707/103 R; 707/205; 707/204
(58) Field of Classification Search ................. 707/205
See application file for complete search history.

(56) References Cited

U.S. PATENT DOCUMENTS

| | | | |
|---|---|---|---|
| 6,795,834 B2* | 9/2004 | Higashiura et al. ......... | 707/204 |
| 6,862,689 B2* | 3/2005 | Bergsten et al. ............. | 714/4 |
| 7,007,049 B2* | 2/2006 | Peng ......................... | 707/205 |
| 7,054,888 B2* | 5/2006 | LaChapelle et al. ..... | 707/104.1 |
| 2005/0091268 A1* | 4/2005 | Meyer et al. .......... | 707/103 R |

* cited by examiner

*Primary Examiner*—Don Wong
*Assistant Examiner*—Binh V Ho
(74) *Attorney, Agent, or Firm*—Lerner, David, Littenberg, Krumholz & Mentlik, LLP

(57) ABSTRACT

In executing a variety of processing operations for contents data, such as reproducing the contents data, the time until booting the application to enable the operations is shortened. A database file for management of contents data is stored in a hard disc drive and the data for hard disc contents controller (hdcc) processing, formulated on the basis of the database (a data image of the file for hdcc processing) is then saved. Using this data for hdcc processing, the application executes the required processing for the contents data. If, depending on the results of the processing by the application, the registration processing for the database becomes needed, the registration processing for the data for hdcc processing is necessarily executed. By so doing, the data for hdcc processing is kept synchronized with the database file at all times.

8 Claims, 11 Drawing Sheets

INITIALIZING PROCESSING

FIG. 6 INITIALIZING SEQUENCE (MATCHED)

FIG. 7 INITIALIZING SEQUENCE (NOT MATCHED)

FIG. 9 REGISTRATION SEQUENCE

END PROCESSING

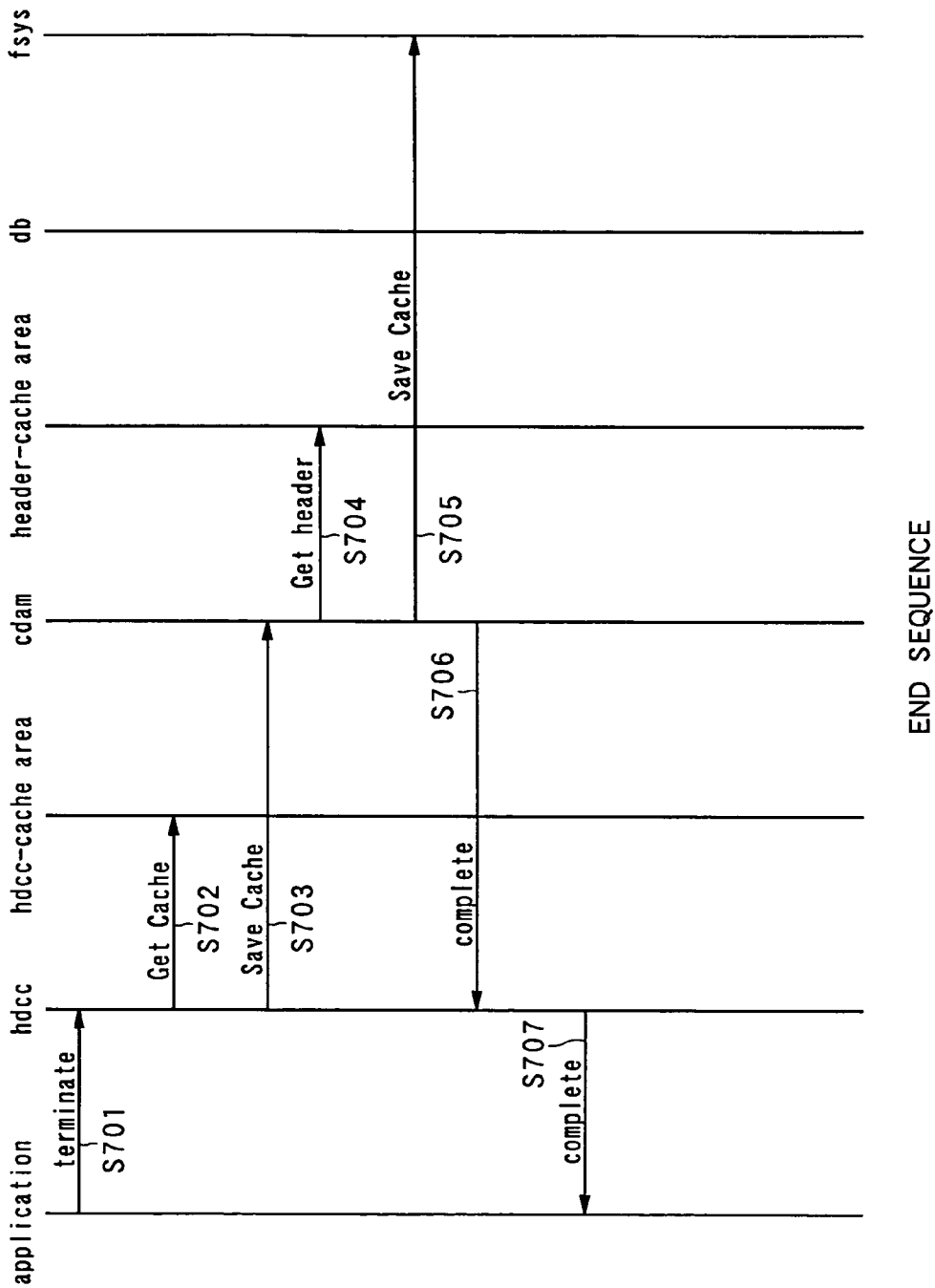
FIG. 11 END SEQUENCE

INFORMATION PROCESSING METHOD, APPARATUS, PROGRAM AND RECORDING MEDIUM

BACKGROUND OF THE INVENTION

1. Field of the Invention

This invention relates to a method and an apparatus for information processing capable of executing a variety of processing operations for contents data, including e.g. the reproduction of contents data first of all. This invention also relates to a program for execution by such information processing apparatus and to a recording medium having the program stored thereon.

2. Description of Related Art

Recently, an inexpensive hard disc drive (HDD) of a large storage capacity has come into a widespread use. In keeping up therewith, the so-called ripping of recording and saving the audio data, recorded in a medium, such as a CD (Compact Disc), on the hard disc, has become disseminated. This ripping becomes possible by constructing the audio equipment combined from the disc drive capable of reproducing the CD and the HDD. The ripping is also possible with e.g. a personal computer.

Meanwhile, in ripping the sound source of a CD, it is routinely practiced to compress and record audio data in accordance with e.g. the ATRAC (Adaptive Transform Acoustic Coding) system or the MP3 (MPEG-1 Audio layer 3) system.

If audio data, such as a large number of musical numbers, are recorded by ripping on a hard disc as a file, the user may not feel bothered in exchanging and reproducing a CD of an album he/she desires to listen to so that a music listening environment is richer than that attained before.

In the present specification, the file-based AV (audio video) data stored in the recording medium, such as HDD, including the aforementioned audio data first of all, are termed 'contents data'.

In the contents management application, supervising and reproducing the large number of contents data, recorded on the HDD, the database is routinely used in order to realize efficient management and reproduction of the contents data.

This database is formulated by the contents management information and stored in the HDD.

This database supervises the directories (paths) in the HDD from one contents data to another. A wide variety of the attribute information, including the contents data based titles, artist names or compression formats, first and foremost, are also supervised. There are occasions where relevant data, termed fringe data, typified by the picture data as album jackets or lyric cards, are recorded in conjunction with the contents data. These fringe data are also supervised, such as by showing the paths of the fringe data.

When booting e.g. the contents management application, the information as needed is selected and collected from the database, and the so collected information is utilized to prepare data for contents processing which the contents management application directly exploits for contents management and reproduction. The data for contents processing may be exemplified by list data needed for displaying an overview as a list of the contents registered in the database. Thus, the operation for the contents management operations for such case becomes possible only after the data for contents processing has been completely formulated and the list has been displayed.

The data for contents processing, formulated as described above, is unfolded not on the HDD but on a cache, such as RAM. The contents management application is configured to interpret the data for contents management, thus unfolded on the cache, to execute the list display as described above. That is, if once the data for contents processing is saved in the cache, it is sufficient to access not the database stored in the HDD but the cache area to process the data for contents processing, thus assuring efficient contents management and reproducing operations. As the technique for data read/write, exploiting the cache, there is known such technique disclosed in the Japanese Laying-Open Patent Publication 2002-27419 (Patent Publication 1).

Meanwhile, the cache herein denotes an area on a volatile memory, such as RAM, and has a meaning different from a memory, termed a cache memory, interposed between the CPU and the RAM or the HDD.

However, the processing for filtering and extracting the needed information from the database, in preparing the data for contents processing as described above, is comparatively heavy and time-consuming.

Thus, in the current state of the art, it takes considerable time until the contents management application is completely booted, such as by completion of the list display, to enable the operation. This unduly stresses the user and hence is not desirable. The problem becomes more outstanding in case the number of contents data under management is increased, because the time for formulating the data for contents processing is then protracted.

In an actual system, the data for contents processing is formulated only from the information required for displaying one picture, in connection e.g. with list display, in view of the considerable time needed in formulating the data for contents processing. The data for contents processing is formulated by accessing the database responsive to the scrolling of the list displayed and to the depletion of the data for list display. That is, the processing algorithm currently used is that the data for contents processing which is necessary minimum is prepared from time to time.

With this processing algorithm, in which considerable processing time is needed to prepare each data for contents processing, list display responsive to e.g. scrolling is not smooth, thus again stressing the user.

Moreover, the database is accessed non-periodically responsive to e.g. scrolling, so that other processing, such as reproduction of contents data, executed in real-time, tends to be retarded, thus possibly interfering with stable reproduction of contents data. From the same reason, difficulties may possibly be encountered in achieving stabilized reproduction in need of continuous reproduction between contents data, such as live sound sources, or stabilized special reproduction, such as repeat or random reproduction.

That is, in formulating data for contents processing and for caching under the current state, it takes considerable time to formulate the data for contents processing, so that the time needed since the start of the booting of the contents management application until the operation is enabled is also considerable. Moreover, the risk is high that other processing is impaired in stability.

SUMMARY OF THE INVENTION

It is therefore an object of the present invention to overcome the aforementioned problems in the conventional technique.

In one aspect, the present invention provides an information processing apparatus comprising first non-volatile storage means for storage of a database supervising at least one unit data stored in a recording medium, first registration means for carrying out registration process with the database, first information holding means for holding unit data process information which has been formulated using predetermined information of information forming the database and which is used for predetermined processing for the unit data, unit data processing means for carrying out the predetermined processing for the unit data using the unit data process information, and second registration means for carrying out registration processing for the unit data process information. The second registration means operates responsive to the results of the processing carried out by the unit data processing means to execute the registration processing for the unit data process information in keeping with the results of the processing when the registration processing for the database by the first registration means is executed.

In another aspect, the present invention provides an information processing method comprising the steps of first registration processing for executing the registration processing for a database which is the information supervising at least one unit data stored in a recording medium and which is stored in a non-volatile storage area, processing for unit data for carrying out a required processing for the unit data, using the information for contents processing, saved in an information holding area, the information for contents processing being the information formulated using predetermined information of information forming the database and utilized in the required processing for the unit data, and second registration processing for executing the registration processing for the information for contents processing. In case the registration processing for the database by the first registration processing is carried out, responsive to the results of processing as the processing for the unit data, the second registration processing executes the registration processing for the information for processing the unit data in keeping with the results of processing.

In still another aspect, the present invention provides a computer program product for information processing, comprising the steps of first registration processing for executing the registration processing for a database, which is the information supervising at least one unit data stored in a recording medium and which is stored in a non-volatile storage area, processing for unit data for carrying out a required processing for the unit data, using the information for contents processing, held in an information holding area, the information for contents processing being the information formulated using the predetermined information of information forming the database and utilized in the required processing for the unit data, and second registration processing for executing the registration processing for the information for contents processing. In case the registration processing for the database by the first registration processing is carried out, responsive to the results of processing as the processing for the unit data, the second registration processing executes the registration processing for the information for processing the unit data in keeping with the results of processing.

In yet another aspect, the present invention provides a recording medium having recorded thereon a program executed on an information processing apparatus, comprising the steps of first registration processing for executing the registration processing for a database which is the information supervising at least one unit data stored in a recording medium and which is stored in a non-volatile storage area, processing for unit data for carrying out required processing for the unit data, using the information for contents processing, held in an information holding area, the information for contents processing being the information formulated using the predetermined information of information forming the database and utilized in the required processing for the unit data, and second registration processing for executing the registration processing for the information for contents processing. In case the registration processing for the database by the first registration processing is carried out, responsive to the results of processing as the processing for the unit data, the second registration processing executes the registration processing for the information for processing the unit data in keeping with the results of processing.

In the above aspects of the present invention, the information for contents processing, formulated on the basis of the database stored in the first non-volatile means (non-volatile area), is saved in the first information holding means (information holding area).

In executing the processing for unit data, that is, the processing directed to the unit data, the information for contents processing, saved in the first information holding means (information holding area), is used.

In case the registration processing for the database is executed, responsive to the results of processing of the processing for unit data, the registration processing for the information for contents processing, saved in the first information holding means (information holding area), is carried out responsive to the same results of the processing for the unit data.

By so doing, if once the information for contents processing has been formed at the outset based on the database, the synchronized state between the database and the information for contents processing is achieved at all times.

According to the present invention, the database for management of the contents data (unit data) is stored in the HDD (non-volatile storage means/storage area). The data for hdcc processing, prepared on the basis of the database (a data image of a file for hdcc processing or information for processing unit data) is then saved. An application (unit data processing means) utilizes this data for hdcc processing to execute the processing as needed for the contents data.

In case the registration processing for the database has become necessary depending on the results of processing of the application, the registration processing for the data for hdcc processing is necessarily carried out.

By so doing, if only the data for hdcc processing has initially been prepared at the outset, the data for hdcc processing, synchronized with the database, is subsequently acquired. Thus, in case it has become necessary to mount the data for hdcc processing, such as with booting of an application, it is sufficient to mount the data for hdcc processing, obtained so far, without preparing the data using the database information from time to time.

The processing for formulating the data for hdcc processing using the database information is heavy and moreover is time-consuming. Conversely, the processing of mounting the preexisting data for hdcc processing is light and takes relatively short processing time. Thus, according to the present invention, only an appreciably short time is necessary since booting of the application until the data for hdcc processing is processable, that is, the time since the completion of booting of the application until the operation becomes possible may be shorter. In addition, the processing needed at this time is of light load and hence is not obstructive to the other processing.

BRIEF DESCRIPTION OF THE DRAWINGS

FIG. 11 is an arrow chart showing the end processing under a program structure shown in FIG. 3.

DESCRIPTION OF PREFERRED EMBODIMENTS

Figure 1:
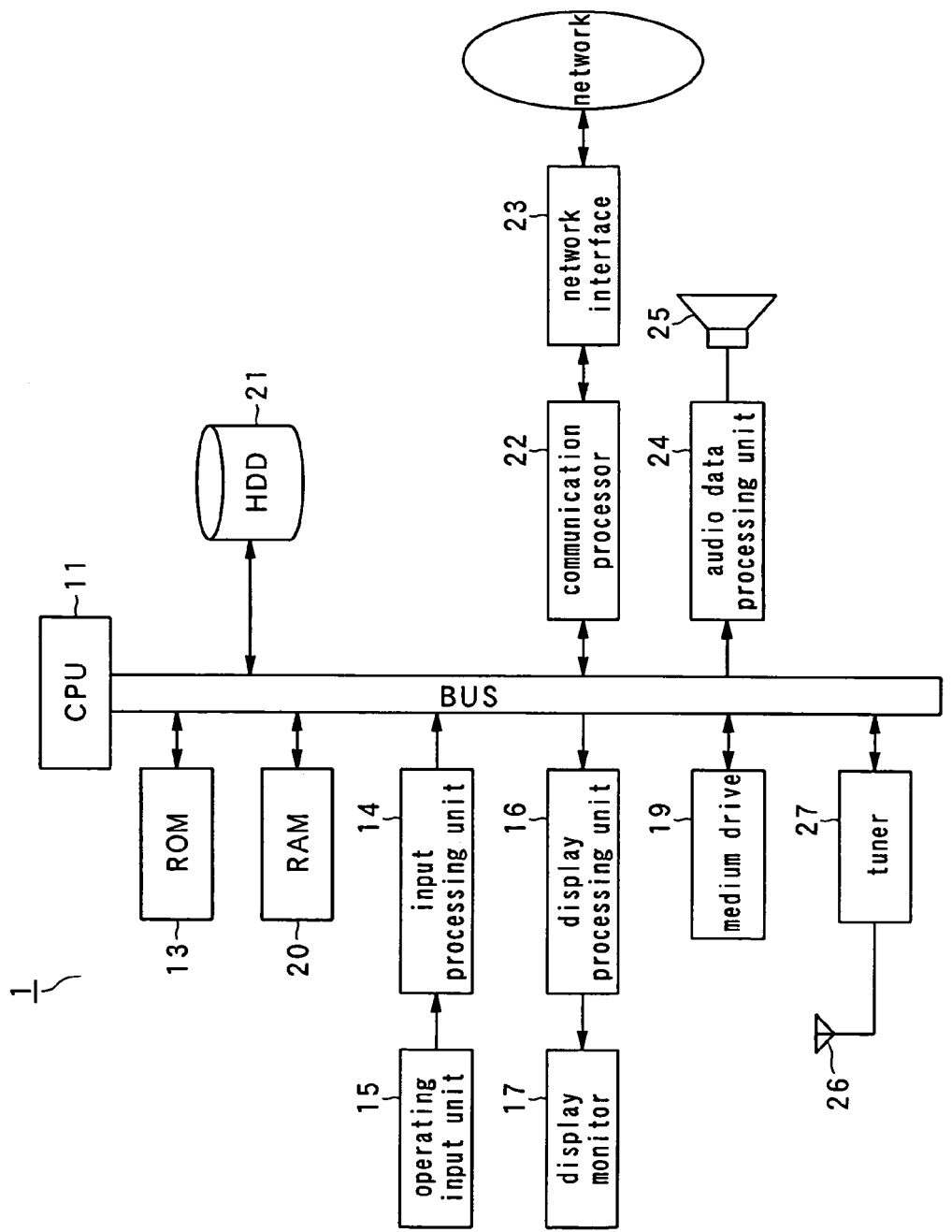
FIG. 1 is a block diagram showing an illustrative structure of a recording and/or reproducing apparatus embodying the present invention.

In the following, preferred embodiments of the present invention are explained. The ensuing explanation is made in the following sequence:
1. Structure of a recording and/or reproducing apparatus
2. Directory management of contents data
3. Program structure for contents data management
4. File structure
5. Initializing processing
6. Registration processing
7. End processing 1. Structure of a Recording and/or Reproducing Apparatus The block diagram of FIG. 1 shows an illustrative structure of a recording and/or reproducing apparatus 1 as an information processing apparatus embodying the present invention.

A CPU (central processing unit) 11 performs overall control and calculations for the recording and/or reproducing apparatus 1 based on a booted program. For example, the CPU 11 takes charge of the operation for communication over the network, input/output processing for a user, contents reproduction or ripping from a medium, contents storage for an HDD 21 and management therefor. For simplicity of the following explanation, the contents data that may be recorded and/or reproduced by the present embodiment of the recording and/or reproducing apparatus 1 are assumed to be audio contents data.

The CPU 11 exchanges control signals or data with respective circuit units over a bus 12.

In a ROM 13, an operating program to be executed by the CPU 11, a program loader, coefficients for various calculations and parameters used in programs are stored.

In a RAM 20, programs to be executed by the CPU 11 are stored. The RAM 20 is also used as a data area or as a task area as needed for the CPU 11 to execute various processing operations.

An operating input unit 15 is a site including various operators, such as operating keys, a jog dial or a touch panel, provided to the casing of the recording and/or reproducing apparatus 1. A keyboard or a mouse for operating a GUI (graphic user interface) may also be provided as the operating input unit 15. The operating input unit 15 may also be designed as a remote controller.

The information entered via the operating input unit 15 is subjected to predetermined processing in an input processing unit 14 and transmitted as an operating command to the CPU 11. The CPU 11 is responsive to the input operating command to execute the calculations or control operations.

As a display monitor 17, a display device, such as a liquid crystal display, is connected to display the information of many sorts.

When the CPU 11 sends the display information to a display processing unit 16, responsive to the various operating states, input states or communication states, a display monitor 17 performs the display operation, based on display data supplied thereto.

In the present embodiment, for example, a GUI picture for supervising and reproducing an audio file in accordance with the program for reproducing and supervising the ripped audio file is displayed.

A medium drive 19 in this case is a drive capable of at least reproducing a preset medium. Of course, the medium drive 19 may be a drive not only for reproducing but also for recording a preset medium.

Although there is no limitation to the mediums that can be coped with by the medium drive 19, these may, for example, be any of a variety of optical disc-shaped recording mediums, such as CD, DVD or Mini-Disc. The medium may also be formed by a memory device, such as flash memory. The medium drive 19 may also be a variety of drives individually associated with these variable mediums and connected to the bus 12.

For example, if the user has commanded reproduction for the medium to the medium drive 19 by an operation to the operating input unit 15, the CPU 11 commands medium drive 19 to reproduce the medium. Responsive thereto, the medium drive 19 accesses the specified data from the loaded medium to read out the data.

In case the data so read out is the audio contents, these contents are decoded as necessary by the processing from the CPU 11 and thence transferred to an audio input/output processing unit 24. The audio input/output processing unit 24 performs sound field processing, such as equalization, sound volume adjustment, D/A conversion or amplification, to output the so processed data from a loudspeaker 25.

The data reproduced by the medium drive 19 may also be stored as an audio data file in the HDD 21 under control by the CPU 11. That is, the audio data file, obtained by so-called ripping, may be stored as contents data.

Meanwhile, the audio data file may be in the form of digital audio data for 16 bit quantization, with the sampling frequency for the CD format of 44.1 kHz, or may be compressed audio data, subjected to compression processing in accordance with the preset format, in order to save the capacity of the HDD 21. Although there is no limitation as to the compression system, the ATRAC (Adaptive Transform Acoustic Coding) system or the MP3 (MPEG-1 Audio Layer 3) system may also be used.

A tuner unit 27 may be an AM.FM radio tuner and demodulates the broadcast signals received by an antenna 26 under control by the CPU 11. The tuner unit may, of course, be a TV tuner, a BS tuner or a digital broadcast tuner.

The broadcast audio signals are processed as needed by an audio data processor 24 and output as broadcast speech via loudspeaker 25.

A communication processor 22 encodes transmission data or decodes received data, under control by the CPU 11.

A network interface 23 sends the transmission data, encoded by the communication processor 22, over the network to a preset unit adapted for coping with the exterior network. The network interfacing unit also delivers the signals, sent over the network from the unit adapted for coping with the exterior network, to the communication processor 22.

The communication processor 22 transmits the received information to the CPU 11.

The structure of the recording and/or reproducing apparatus 1 is not limited to that described above with reference to FIG. 1 and may be variably formed.

For example, the recording and/or reproducing apparatus may be provided with an interface with peripherals in accordance with the communication system exemplified by the USB (universal serial bus), IEEE1394, or Bluetooth.

The audio contents data, downloaded over the network by the network interface 23 as well as the audio contents data, sent via interface, such as via USB or IEEE1394, may be stored in the HDD 21.

There may also be provided a terminal used for connection to a microphone or to an exterior headphone, a video output terminal for coping with DVD reproduction, a line connection terminal or an optical digital connection terminal.

There may also be formed a PCMCIA slot or a memory card slot for enabling data exchange with an exterior information processing apparatus or an audio apparatus.

2. Directory Management of Contents Data

As may be understood from the above explanation by FIG. 1, the recording and/or reproducing apparatus 1 of the present embodiment is able to store the contents data, as an audio data file, in the HDD 21 thereof.

Figure 2:
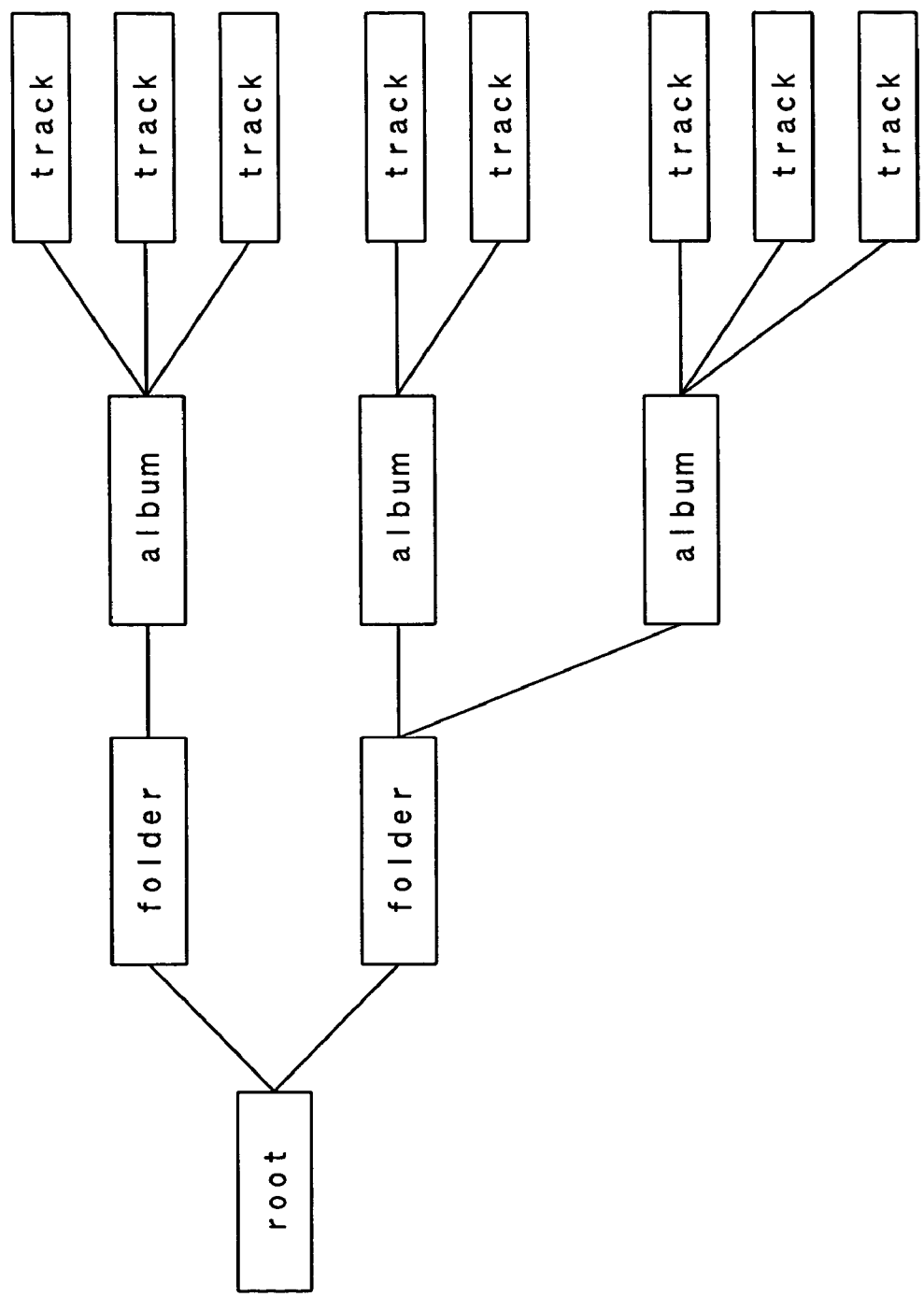
FIG. 2 illustrates directory management of contents data stored in a HDD of the recording and/or reproducing apparatus embodying the present invention.

The contents data may be supervised on the HDD 21 as shown in FIG. 2.

First, an optional number, within an allowed range, of folders may be placed in a subjacent layer of a root directory. These folders are prepared in association with a genre to which belong the contents data, or with the owner user.

An optional number, within an allowed range, of albums may be placed in a subjacent layer of the folders. The albums are associated e.g. from one album title to another. Below the album directory are placed one or more tracks to which belongs the album in question. The trackbased unit data represents one contents data.

The directory management for these contents data is carried out by a database file stored in the HDD 21. The database file will be explained subsequently.

3. Program Structure for Contents Data Management

In the present embodiment, the program for enabling management/reproduction of contents data is installed in the HDD 21 for storage therein.

Figure 3:
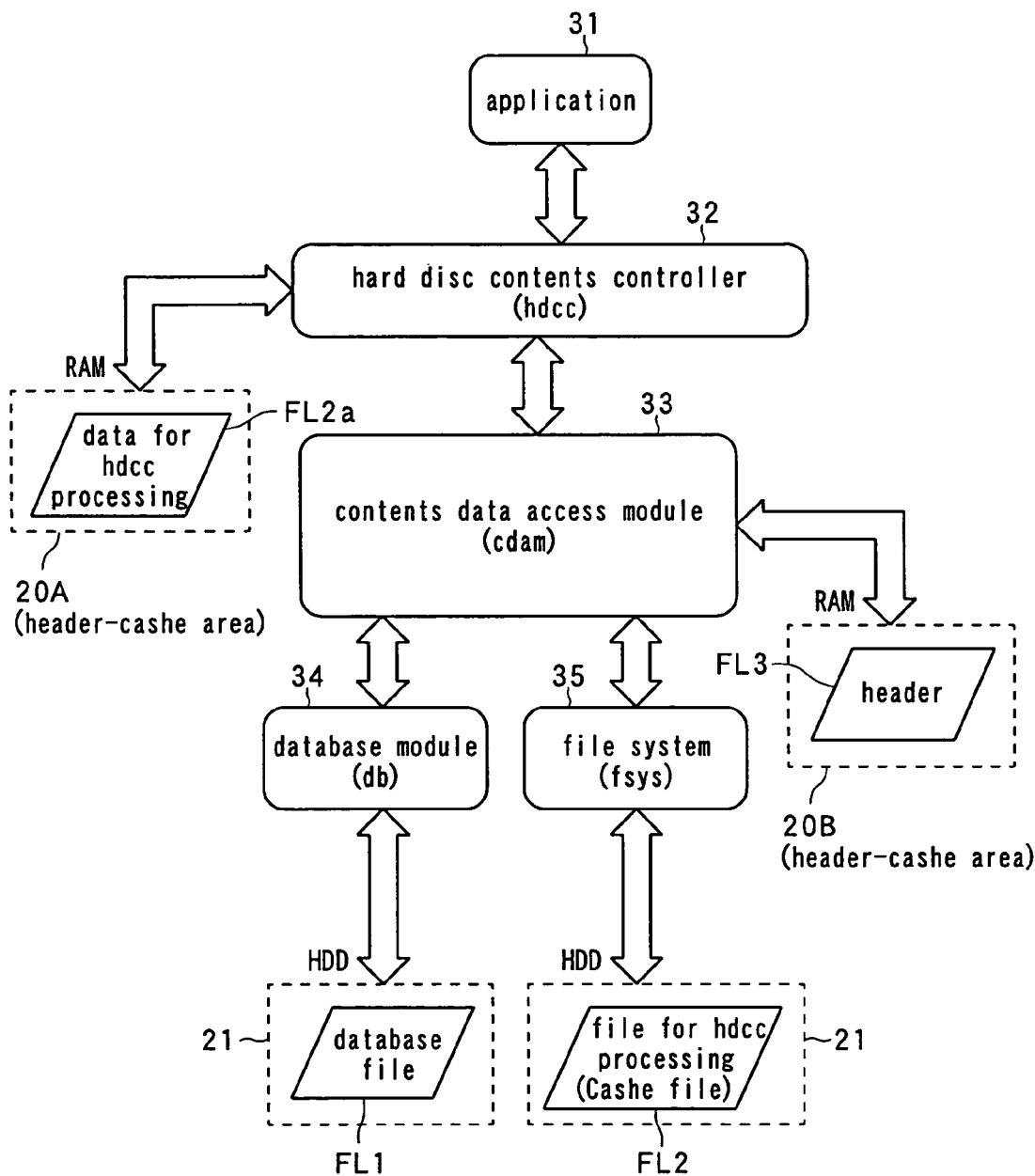
FIG. 3 is a block diagram showing the structure of a program for management/reproduction of contents data.

FIG. 3 shows, in a block diagram, the structure of a program for such management/reproduction of the contents data. For confirmation sake, the programs of various sorts, shown in FIG. 3, operate on an OS (operating system).

An application 31, lying in the uppermost layer as the program, is an application program capable of executing the required functional operations associated with the contents data. It is noted that the application 31 has the function as a so-called contents player capable of supervising and reproducing the contents as an audio data file stored in the HDD 21.

This application 31 issues commands or events to the lower layers in accordance with the operation by the user on the application 31 or with the flow of the program operations. This achieves the operation as the application 31.

In the program structure, shown in the drawing, the application for executing the processing on the contents data using the data base cache of the present embodiment may be an application different from the application 31 as the aforementioned contents player. There may also be installed a plural number of the applications exploiting the data base cache of the present embodiment. In case there are plural applications installed, it may be contemplated to boot these applications simultaneously and subsequently to have the database cache system by the subjacent programs co-owned by the so booted applications.

As a layer subjacent to the application 31, there is a program as a hard disc contents controller (hdcc) 32.

This hdcc 32 is able to construe e.g. a command issued from the application 31. Responsive to the command, issued from the application 31, the hdcc 32 performs control on a subjacent contents data access module 33.

The hdcc 32 also supervises and processes data for hdcc processing FL2*a* held in a hdcc cache area 20A (first information holding means) in the RAM 20.

The data for hdcc processing FL2*a* is formed by extracting the information needed for the application 31 to execute contents management and reproduction, from a set of tables forming a database file FL1.

When the application 31 is being booted, the list of the contents stored in the HDD 21 is displayed, along with the attribute information thereof, such as titles, artist names or relevant album titles, and data pertinent to the contents, including, first and foremost, the picture data of the album jacket (fringe data). The data for hdcc processing FL2*a* is constructed by including the attribute information required for displaying the list of these contents data and the fringe data following the decoding processing.

The data for hdcc processing FL2*a* also includes the information, such as a path on the HDD 21 in which the contents data are stored. By having reference to the information on the path of the contents data, it becomes possible to utilize e.g. the file system to read out the contents data being reproduced from the HDD 21 to execute the reproduction processing.

That is, the data for hdcc processing FL2*a* is the information which may be used by the application 31 or the hdcc 32 in executing the required processing, such as management or reproduction, on the contents data. Stated differently, the data for hdcc processing FL2*a* is the information corresponding to the database file FL1 reconstructed in a form processable by the application 31 or the hdcc 32.

Figure 4:
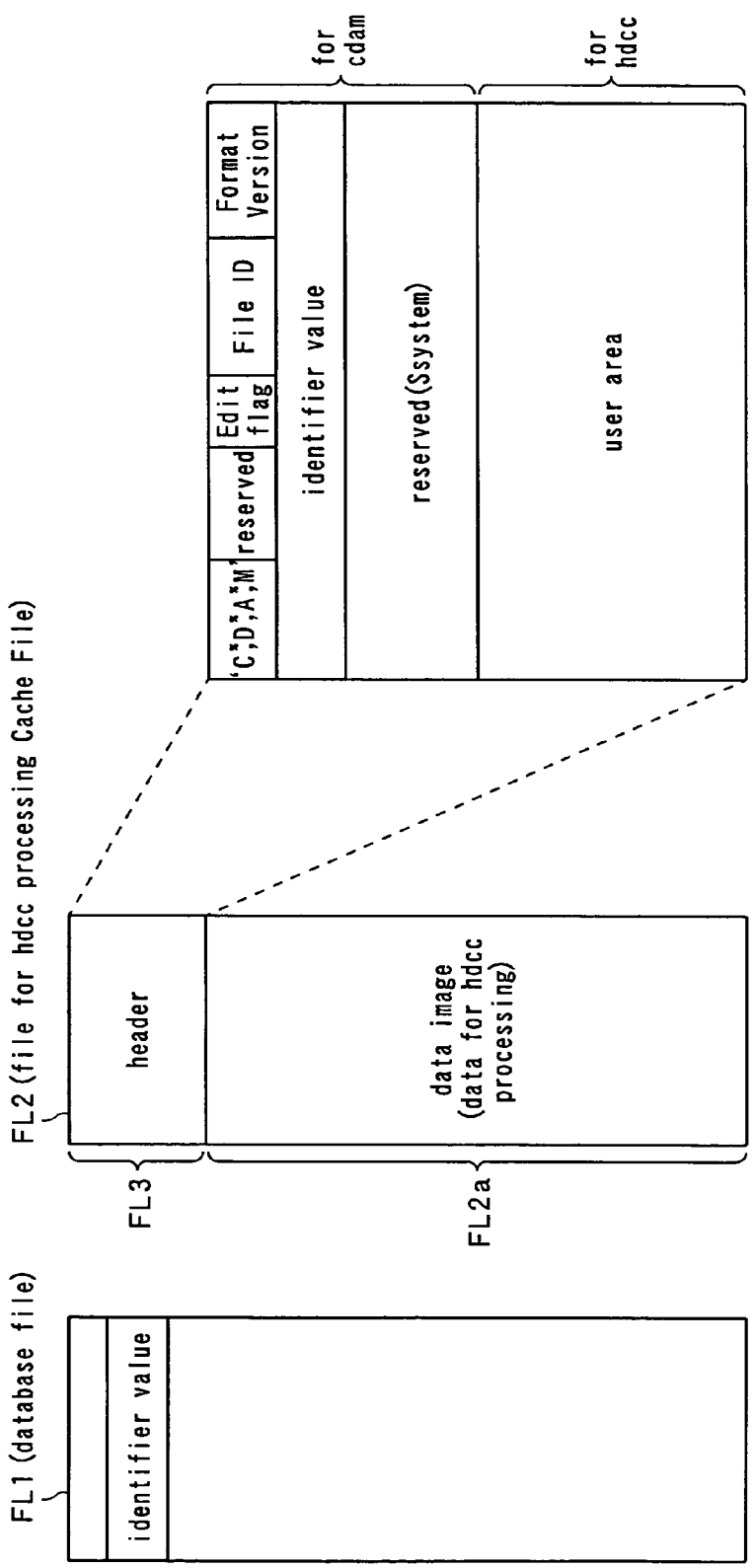
FIG. 4 illustrates an illustrative structure of a file for hdcc processing and a database file embodying the present invention.

The content data access module (cdam) 33 is a program responsible for accessing to the HDD 21 for readout and write of data pertinent to the contents data. In a subjacent layer of the cdam 33, there are a database module (db) 34 which is a program stored in the HDD 21 (first non-volatile storage means) for executing the processing on the database file FL1 and a file system (fsys) 35 for executing file-based readout/write from the HDD 21. In FIG. 3, there is shown a file FL2 for hdcc processing, pertinent to management of the contents data. This file FL2 for hdcc processing is a file stored in the HDD 21 (second and third non-volatile storage means) and which is to be read out/written by the file system (fsys) 35. The file FL2 for hdcc processing will be explained subsequently with reference to FIG. 4.

The cdam 33 executes the write/readout processing on the header information FL3 held in a header-cache area 20B in the RAM 20. This header information FL3 will also be explained subsequently with reference to FIG. 4.

Thus, the program structure supervising the contents data is made up by the application 31, hdcc 33, data base module 34 and the file system 35.

With this program structure, the information used for contents data management is made up by the database file FL1, file FL2 for hdcc processing, data for hdcc processing FL2a and the header information FL3.

It is noted that the database file FL1 and the file FL2 for hdcc processing are data stored in the HDD 21 as a non-volatile storage area and which is kept even after supply interruption of the power source.

Conversely, the data for hdcc processing FL2a and the header information FL3 are kept in a storage area provided in the RAM 20, as a volatile storage area, and may be erased as the application 31 has come to a close.

4. File Structure

Thus, in the present embodiment, the information utilized for contents data management is made up by the database file FL1, file FL2 for hdcc processing, data for hdcc processing FL2a and the header information FL3. For illustration of the above information, the structure of the database file FL1 and the file FL2 for hdcc processing is now explained with reference to FIG. 4.

FIG. 4a shows the database file FL1.

This database file FL1 has stored therein the information supervising the directory structure among the contents data as described with reference to FIG. 2.

The contents data based directory (path) in the HDD 21, for example, is also supervised.

The various contents data based attribute information, including the title, artist's name and the compression format, first and foremost, is also supervised.

There are occasions where, as for the contents data, relevant data, termed fringe data, such as those typified by album jackets or video data as a lyric card, are concomitantly recorded in the HDD 21. These fringe data are also managed by indicating the path for these fringe data.

As the database file FL1 of the present embodiment, the above-described various sorts of the information as needed are stored on the table basis in accordance with a preset structure. In addition, an Identifier Value by a preset data size is stored in a preset area, as shown in FIG. 4a.

This Identifier Value is the information required for confirming the matching (scrutinizing into synchronized state) with the contents of the file FL2 for hdcc processing similarly stored in the HDD 21. In the present embodiment, the Identifier Value is the information indicating the date and time of the last registration (updating) for the database file FL1. The Identifier Value may also be the preset identification information for data contents, including the information indicating the number of data entries and the data structure first and foremost. The Identifier Value may also be the combination of the date and time information and the preset identification information for data contents.

FIG. 4b shows the structure of the file FL2 for hdcc processing, stored in the HDD 21.

Meanwhile, in initializing the file FL2 for hdcc processing, saved in the hdcc-cache area 20A, as later explained, it is usually not reconstructed from the database file FL1, but the data image of the file FL2 for hdcc processing is directly transferred to and saved in the hdcc-cache area 20A.

That is, the file FL2 for hdcc processing has the meaning as the cache data in the database system. Consequently, the file FL2 for hdcc processing is sometimes called a cache file.

In FIG. 4b, the file FL2 for hdcc processing includes a header area of a preset size, as a leading area, followed by the data image which is real data as the file FL2 for hdcc processing.

The data of the header area of the file FL2 for hdcc processing becomes the header information FL3 stored in a headercache area 20B of the RAM 20. The data image of the file FL2 for hdcc processing directly becomes the data contents of the file FL2 for hdcc processing which should be stored in a hdcc-cache area 20A in the RAM 20.

That is, the header information FL3 may be obtained by accessing the HDD21 to acquire the data of the header area of the file FL2 for hdcc processing and by writing and saving the data in the header-cache area 20B.

In similar manner, the data for hdcc processing FL2a may be obtained by accessing the HDD 21 to acquire the data image of the file FL2 for hdcc processing and by writing and saving the data in the hdcc-cache area 20A.

FIG. 4c shows the structure of the header area of the file FL2 for hdcc processing. For confirmation sake, the header information FL3, saved in the header-cache area 20B, has a comparable structure.

First, in the leading area of the preset size, there is stored the identification information for identifying the file type. That is, the file type being the file FL2 for hdcc processing is indicated by the value stored in this area. In this case, a bit value associated e.g. with the statement 'CDAM' is stored.

The Edit Flag is the information needed for data protection. By referring to the value of this flag, it can be presumed whether or not the writing in the HDD 21 has been carried out as regularly.

In the present embodiment, there are occasions where a plural number of the files FL2 for hdcc processing (cache files) are stored. A cache ID is an identifier for identifying each file FL2 for hdcc processing in such case.

In Format Version, a value specifying the version of the format as the file FL2 for hdcc processing is stored.

The Identifier Value in the header area has the same meaning as the Identifier Value of the database file FL1 shown in FIG. 4a.

That is, the Identifier Value is the information required for taking the synchronization (confirming the matching) of the contents of the database file FL1 stored in the HDD 21, and the file FL2 for hdcc processing, similarly stored in the HDD 21, and specifies the time and date of the last registration (updating) in the database file FL1.

It should be noted that the area for storage of the file type identifying information (CDAM), Edit Flag, cache ID, Format Version and Identifier Value is the information construed and processed by the cdam 33.

On the other hand, the optional information that may be construed and processed by the hdcc 32 may be stored in the user area.

For example, the cdam 33 is not the program lying in the application side layer, but is the program lying on the OS side (system side) layer, and executes comparatively primitive processing. Conversely, the hdcc 32, lying in an upper layer of the cdam 33, is an application side program, and executes the more advanced processing. For example, as for the directory of the contents data, the hdcc 32 may refer to the database information to recognize the location of the contents data in the overall directory structure shown for example in FIG. 2. The cdam 33, however, may only recognize a parent directory or a child directory with a given directory as reference.

Hence, by storing the needed data, to be coped with and processed as necessary by the hdcc 32, in the user area, the file FL2 for hdcc processing may be efficiently utilized to add a highly advanced function pertinent e.g. to contents management.

5. Initializing Processing

In light of the foregoing explanation, the processing operation for database caching for coping with contents in the present embodiment is hereinafter explained. First, the initializing processing is explained.

Meanwhile, as may be understood from the following explanation, the data for hdcc processing FL2a is inherently formulated by reconstructing the database file FL1. However, in the present embodiment, the data image, acquired from the file FL2 for hdcc processing, stored in the HDD 21, is directly held as the data for hdcc processing FL2a in the hdcc-cache area 20A. That is, in the database system, the file FL2 for hdcc processing is handled as cache data in acquiring the data for hdcc processing FL2a. The database cache herein denotes such system operation.

The initializing processing herein denotes the processing of mounting (saving) the data for hdcc processing FL2a in the hdcc-ache area 20A, which has so far been a void area, responsive to e.g. booting of the application 31.

Figure 5:
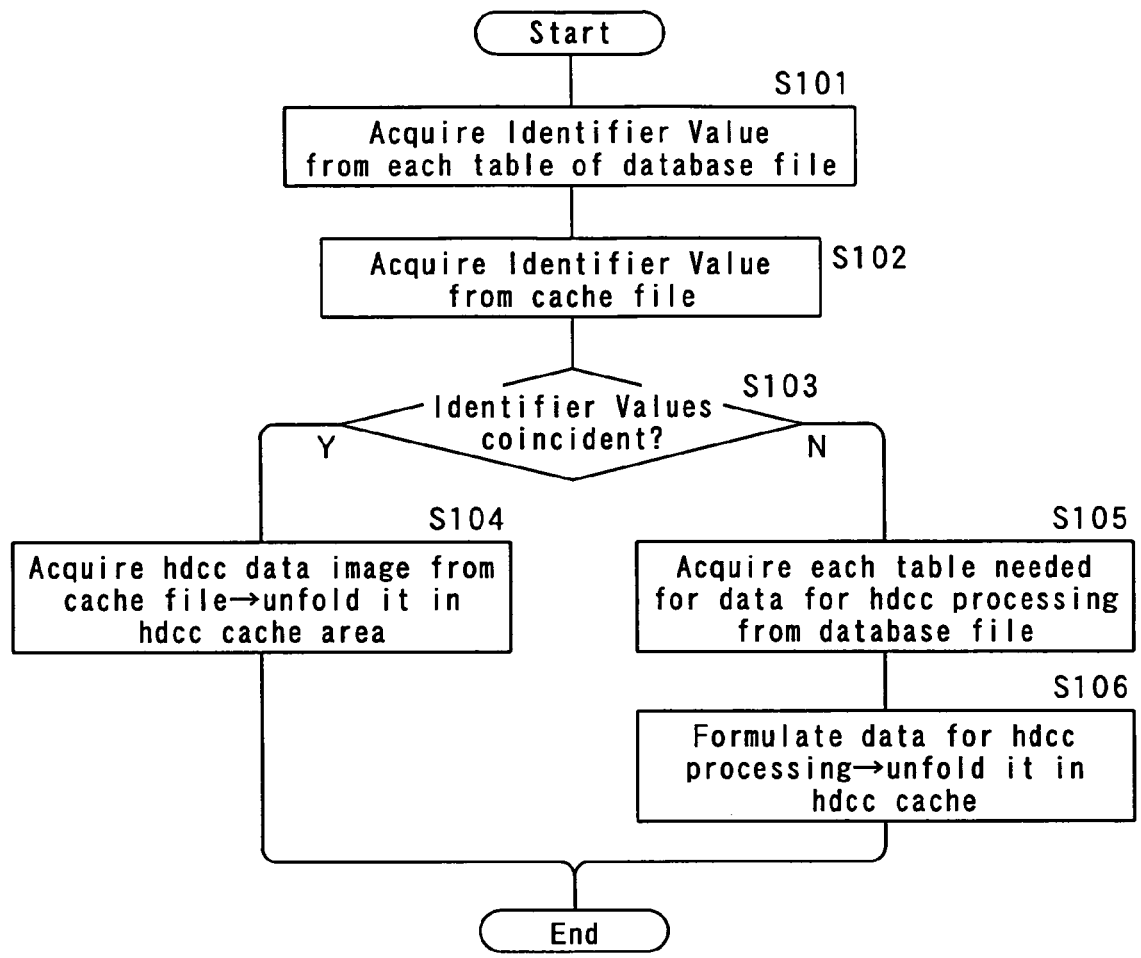
FIG. 5 is a flowchart showing the initializing processing as processing for database caching.

FIG. 5 shows the flow of the initializing processing by a flowchart. It is noted that the processing shown in this figure is executed by the CPU 11 in accordance with the program under the program structure shown for example in FIG. 4.

For example, in case a command for initialization is issued, such as by booting the application 31, the processing of step S101 is carried out.

In the step S101, the database file FL1, stored in the HDD 21, is accessed, and the Identifier Value is acquired from each table forming the database file FL1. That is, the Identifier Value stored in the structure of each table of the database file FL1 is read in as explained with reference to FIG. 4a.

In the next step S102, the cache file stored in the HDD 21 (file FL2 for hdcc processing) is accessed, in order to acquire the Identifier Value stored in the header area.

By the processing of the above steps S101 and S102, the Identifier Values of the database file FL1 and the file FL2 for hdcc processing are acquired. In the step S103, the Identifier Values of the database file FL1 and the file FL2 for hdcc processing are compared to each other to verify whether or not these Identifier Values are equal to each other.

In case the registration processing and the end processing are carried out as regularly, the Identifier Values of the database file FL1 and the data image of the file FL2 for hdcc processing are coincident with each other. Such coincidence of the Identifier Values means that the contents of the database file FL1 are synchronized (matched) to the contents of the data image of the file FL2 for hdcc processing. Conversely, the non-coincidence of the Identifier Values means that, by some or other factor, the contents of the database file FL1 are not synchronized (not matched) to the contents of the data image of the file FL2 for hdcc processing. That is, the processing in the step S103 is the processing for verifying whether or not the contents of the database file FL1 are synchronized (matched) to the contents of the data image of the file FL2 for hdcc processing.

If, in the step S103, the affirmative results are obtained, with the two Identifier Values coinciding with each other, processing transfers to a step S104. If the two Identifier Values are coincident with each other, the contents of the data image of the file FL2 for hdcc processing are synchronized with the contents of registration of the database file FL1. That is, the contents of the data image of the file FL2 for hdcc processing reflect the current contents of the registration of the database file FL1, such that this data image may directly be used as the data for hdcc processing.

Hence, in the processing in the step S104, the file FL2 for hdcc processing (cache file) stored in the HDD 21 is accessed to read-in and acquire the data image. The so acquired data image is written as the data for hdcc processing FL2a in the hdcc-cache area 20A of the RAM 20 and unfolded. Thereafter, the data for hdcc processing FL2a is held in the hdcc-cache area 20A.

If the negative result has been obtained in the step S103, with the two Identifier Values not coinciding with each other, the contents of the data image of the data for hdcc processing FL2a (cache file) are not matched (not synchronized) with the contents of registration of the database file FL1.

It is noted that, after all, the image data of the data for hdcc processing FL2a is formed on the basis of the database file FL1. That is, the contents of the registration of the database file FL1 operate as reference. Thus, of the data image of the file FL2 for hdcc processing (cache file) and the database file FL1, the contents of the database file FL1 are more reliable.

In light of this, the processing downstream of the step S105 is the processing of mounting the data for hdcc processing FL2a, newly formulated using the database file FL1, in the hdcc-cache area 20A.

That is, in the step S105, the processing of accessing the database file FL1, stored in the HDD 21, to select, extract and gather the information necessary for constructing the data for hdcc processing FL2a, from the respective tables, is carried out.

In the next step S106, the data for hdcc processing FL2a is formulated by the gathered information. The data for hdcc processing FL2a, thus formulated, is transferred to and written in the hdcc-cache area 20A, where the data is unfolded and saved.

After the end of the processing in the step S104 or in the step S106, the application 31, for example, and the hdcc 32, are able to utilize the data for hdcc processing FL2a, stored in the hdcc-cache area 20A, to execute the processing, as necessary, including e.g. the list display, first and foremost. This means that the action on the application 31 becomes possible with the end of the processing of the step S104 or the step S106.

With the processing shown in FIG. 5, as long as the data image of the file FL2 for hdcc processing (cache file) and the registration contents of the database file FL1 are synchronized with each other in the initializing processing, this data image is directly handled as the data for hdcc processing FL2a and mounted in the hdcc-cache area 20A.

In the present embodiment, the data image of the file FL2 for hdcc processing (cache file) and the registration contents of the database file FL1 are synchronized with each other if only the registration processing and the end processing as later explained are executed as normally, and hence the processing of the step S104 is executed as the usual initializing processing.

The processing of constructing the file FL2 for hdcc processing from the database file FL1 is relatively time-consuming because it is necessary to extract the necessary information from the database file FL1 responsive to preset filtering conditions. In case the number of the contents data is increased, the processing time is prolonged further. Heretofore, the data for hdcc processing FL2a is constructed from the database file FL1 each time the initialization processing is carried out. That is, the processing of steps S105→S106 is carried out at all times.

In the present embodiment, the processing of the step S104 is carried out as the usual initializing processing. That is, the processing of constructing the data for hdcc processing FL2a from the database file FL1 for each initializing operation is not carried out.

Since the processing of the step S104 is the processing of reading in and transferring the data image from the file FL2 for hdcc processing (cache file) to write the data image in the RAM 20, the processing can be finished in a short time. That is, the processing as the usual initializing processing can be finished in an extremely short time. Moreover, the processing of the step S104 is the light-load processing of writing the data read out from the HDD 21 in the RAM 20, the processing hardly affects other processing, if any, which is being run at the same time. For example, if contents data reproduction is being carried out as such other processing, continuity of the reproduction output is assured, thus enabling stable reproduction output.

Furthermore, in the prior art case, in which the data for hdcc processing FL2a is formulated from the database file FL1 for each initializing operation, the data for hdcc processing FL2a is formulated from the information necessary and sufficient for list display of contents data for one picture. For this reason, the interrupt processing of formulating the data for hdcc processing FL2a from the database file FL1 occurs comparatively frequently responsive to the scrolling of the list picture. In such case, the scroll processing cannot be carried out smoothly. In addition, the other processes tend to be affected frequently, so that continuous reproduction of contents data, or special reproduction, such as random reproduction or repeat reproduction, cannot be carried out in stability.

In the present embodiment, if only the data for hdcc processing FL2a is formulated from the database file FL1, at the outset, the data for hdcc processing FL2a subsequently continues to be synchronized with the database file FL1.

Thus, in the present embodiment, the registration contents of the entire database file FL1 are utilized in initially formulating the data for hdcc processing FL2a from the database file FL1. Although much time is needed in formulating the data for hdcc processing FL2a, if once the data for hdcc processing FL2a is formulated, the data for hdcc processing FL2a may be obtained by readout from the cache file, so that only light-load processing of short duration suffices. It is sufficient to read out data needed for display from the hdcc-cache area 20A of the RAM 20, even if the list picture is scrolled, so that the list picture may be scroll-displayed smoothly.

Moreover, since there is no possibility for the processing of formulating the data for hdcc processing FL2a from the database file FL1 responsive to the scrolling of the list picture, the continuous reproduction or special reproduction of the contents data, described above, may be executed readily in stability.

It is noted that the processing of the steps S105→S106 is the re-synchronizing processing against the error state in which the database file FL1 ceases to be synchronized with the data image of the data for hdcc processing FL2a.

The processing of the steps S105→S106 is somewhat time-consuming, as discussed above. However, this processing is needed in order to achieve recovery such that the database file FL1 is synchronized with the data image of the data for hdcc processing FL2a. Moreover, this processing is not carried out frequently and hence the stress to the user may be minimized.

The initializing processing of the present embodiment is now explained as a processing sequence based on the program structure shown in FIG. 3. For explanation, reference is made to the arrow charts of FIGS. 6 and 7.

Figure 6:
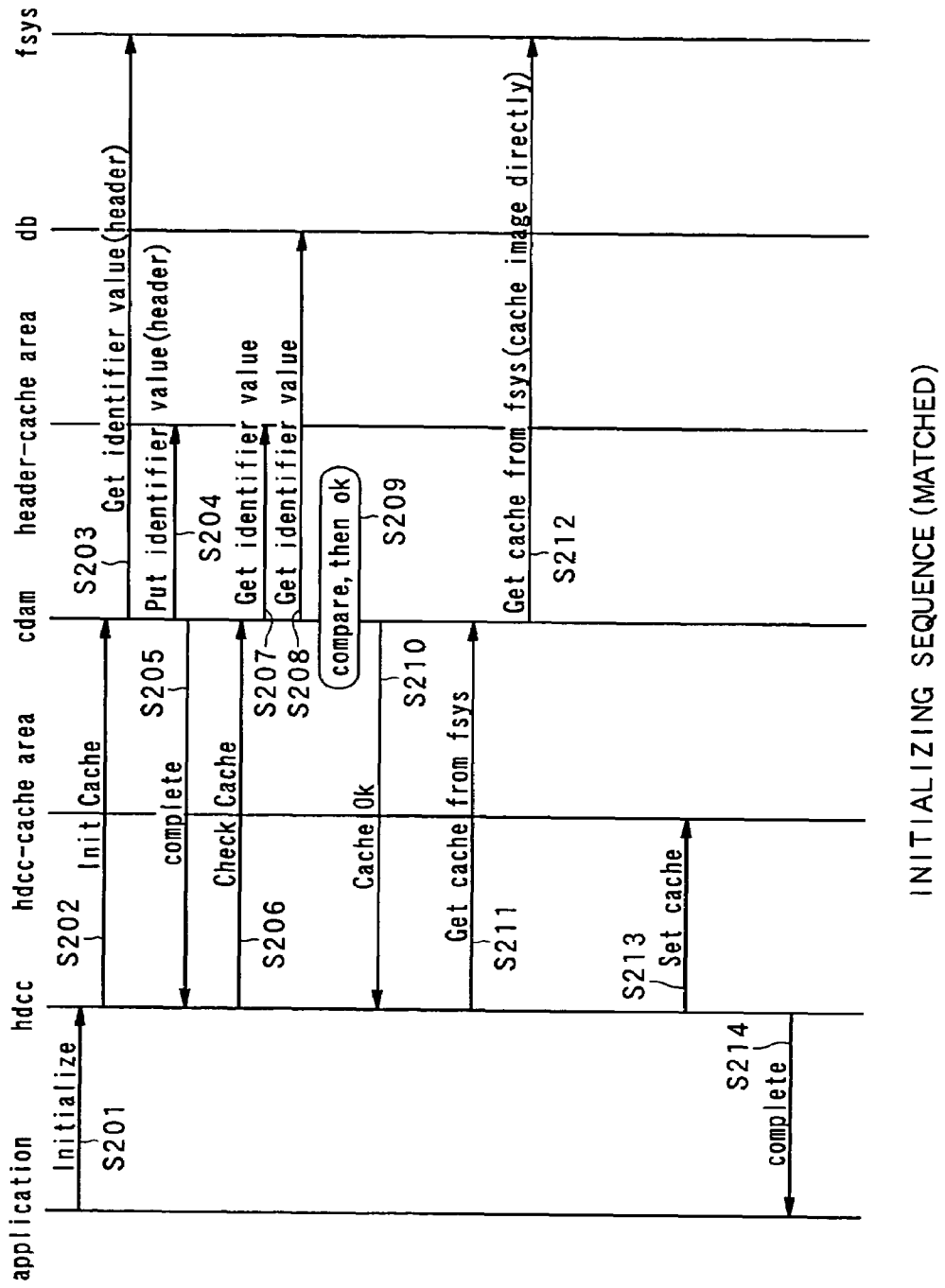
FIG. 6 is an arrow chart showing the sequence of the initializing processing under a program structure shown in FIG. 2.

FIG. 6 shows a sequence of the initializing processing for the case in which the database file FL1 is synchronized (matched) with the data image of the file FL2 for hdcc processing (data for hdcc processing FL2a). The processing sequence, shown in FIG. 6a, corresponds to the processing of step S101→S102→S103→S104 in the flowchart of FIG. 5.

In FIG. 6, an initialize command is first issued from the application 31 to the hdcc 32, by way of the processing of step S201. Responsive to this initialize command, the hdcc 32 issues a cache initialize (Init Cache) command to the cdam 33, by way of the processing of step S202. Responsive to the Init Cache command, the cdam 33 executes the processing as get Identifier Value, using the file system 35, by way of performing the processing of step S203. That is, the cdam 33 acquires the Identifier Value stored in the header area of the file FL2 for hdcc processing, as stored in the HDD 21. However, in this case, in acquiring the Identifier Value, the data of the entire header area of the file FL2 for hdcc processing is to be acquired.

On acquisition of the Identifier Value as described above, the cdam 33 proceeds to the processing of writing and unfolding the so acquired Identifier value in the header-cache area 20B, by the processing as Put Identifier Value in a step S204. In this case, by unfolding of the data in the entire header area acquired in the step S203 in the header-cache area 20B, the Identifier Value may be unfolded in the header-cache area 20B.

On completion of the steps S203→S204, the cdam 33 executes the processing of a step S205. That is, the cdam 33 notifies the hdcc 32 of the completion of the processing corresponding to the command of Init Cache by for example the response 'complete'.

On receipt of the response 'complete', the hdcc 32 in the next step S206 issues a command Check Cache to the cdam 33.

Responsive thereto, the cdam 33 in a processing of a step S207 executes the processing of acquiring the Identifier Value unfolded in the previous step S204 in the header-cache area 20B.

Meanwhile, in the processing of the step S102 of FIG. 5, the Identifier Value is acquired from the header area of the file FL2 for hdcc processing, stored in the HDD 21. In this respect, the processing of the step S102 differs from the processing sequence obtained in the steps S204 and S207 shown in FIG. 6. However, the Identifier Value as acquired by the processing of the steps S204 and S207 in FIG. 6 is essentially the same as that stored in the header area of the file FL2 for hdcc processing stored in the HDD 21.

The cdam 33 then performs the processing of a step S208, next to the step S207, to issue a command to the database module 34 to acquire the Identifier Value from the database file FL1.

In the next step S209, the file FL2 for hdcc processing, acquired in the steps S207, S208, is compared to the database file FL1 as to the Identifier Value. This corresponds to the processing of step S103 in FIG. 5. Since the file FL2 for hdcc processing is synchronized in this case with the database file FL1, the result of comparison of coincidence (ok) is obtained.

If the result of comparison of coincidence (ok) is obtained in this manner, the cdam 33 notifies the hdcc 32, by the processing of a step S210, of the result (ok) of Check Cache, by returning a response (Cache Ok).

On receipt of the above notification of Cache Ok, the hdcc 32 in a step S211 issues a command of Get cache from fsys to the cdam 33. The cdam 33 is responsive to the Get cache from fsys to execute the processing of a step S212. In the step S212, the cdam 33 issues a command to the file system 35 to cause the file system to read in the data image from the file FL2 for hdcc processing stored in the HDD 21. The cdam acquires the so read-in data image.

By the processing in the next step S213, the hdcc 32 executes the processing of unfolding the data image, acquired by the cdam 33, in the hdcc-cache area 20A (Set cache). The processing S211→S212→S213 corresponds to the processing of the step S104 in FIG. 5.

On completion of the processing Set cache, the hdcc 32 notifies the application 31 of the completion of the initializing processing made responsive to the Initialize command (S201) issued by the application 31, as the processing of the next step S214, by a response 'complete'. The sequence of the initializing processing comes to a close by the application 31 recognizing this notification.

Figure 7:
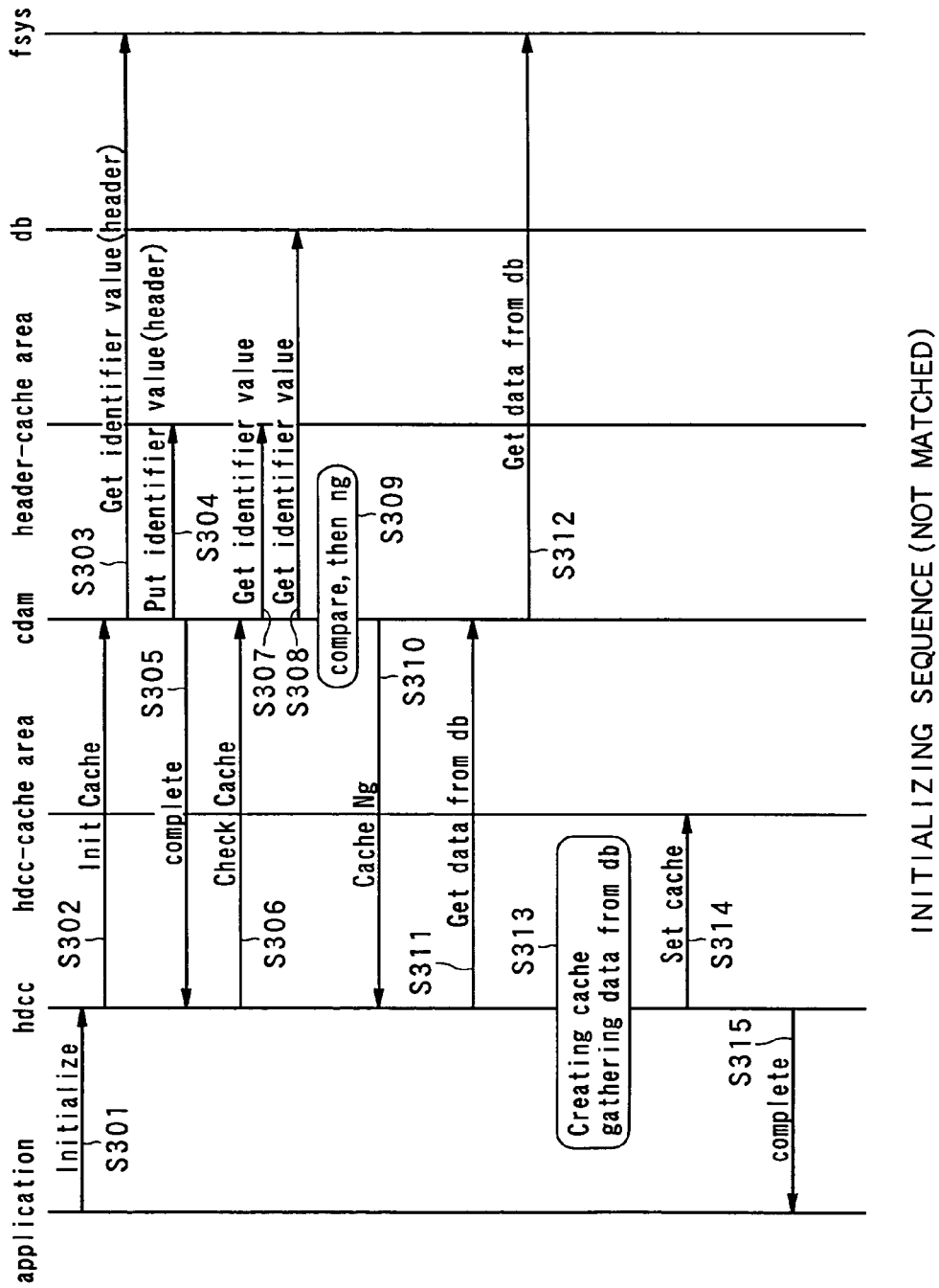
FIG. 7 is an arrow chart showing the sequence of the initializing processing under a program structure shown in FIG. 3.

FIG. 7 shows the sequence of the initializing processing for a case in which the database file FL1 is not synchronized with the data image of the file FL2 for hdcc processing (data for hdcc processing FL2a). This sequence corresponds to the processing sequence of S110→S102→S103→S105→S106.

Since the processing from the step S301 to the step S308 in FIG. 7 is similar to the processing from step S201 to S208 in FIG. 6, the explanation is here omitted for simplicity.

In this case, the result NG indicating the result of comparison of non-coincidence in a step S309 between the file FL2 for hdcc processing and the database file FL1 as to the Identifier Value has been obtained. The non-coincidence of the Identifier Value means that the contents of registration of the database file FL1 are not reflected in the contents of the image data of the file FL2 for hdcc processing, by some processing error, such that the contents are not synchronized with each other.

In this case, the cdam 33 returns a response (Cache NG), in reply to the command Check cache from the hdcc 32, to notify the hdcc that the result of comparison by the step S309 is NG, by the processing from step S301 to step S308.

On receipt of this notification, the hdcc 32 proceeds to a step S311 to issue a command Get data from db to the cdam 33. On receipt of this command, the cdam 33 issues a command to the database module 34, by the processing of a step S312, to cause the database module to read out the database file FL1.

The hdcc 32 extracts the needed information from the database file FL1, read out by the above processing of a step S312, to formulate the data for hdcc processing FL2a, by the processing of the next step S313. The hdcc 32 then transfers the so formulated data for hdcc processing FL2a to the hdcc-cache area 20A to unfold (save) the data therein by the processing of the next following step S314. On completion of this processing, the hdcc 32 notifies the application 31 of the end of the initializing processing by the processing of the next following step S315.

In the processing shown in FIG. 7, the processing sequence of the steps S311 to S314 corresponds to the processing of the steps S105→S106. In the processing sequence of the steps S311 to S314, the steps S312, S313 represent heavy processing which is comparatively time-consuming. By way of comparison, there is no particularly time-consuming heavy processing in the processing sequence of the steps S211 to S213 shown in FIG. 6.

6. Registration Processing

The registration processing in the database caching of the present embodiment is now explained. This registration processing is the processing of changing the contents of the database file FL1, responsive to a change in the management state for the contents data, for reflecting the new management state for the contents data.

The management state is changed here when for example the contents data is added or deleted. The registration processing becomes necessary when the contents data already registered is edited, such as by splitting or coupling, responsive to e.g. an action on the application. The registration processing similarly becomes necessary when the attribute information associated with the contents data is changed or when fringe data is supplemented, deleted or otherwise edited.

Figure 8:
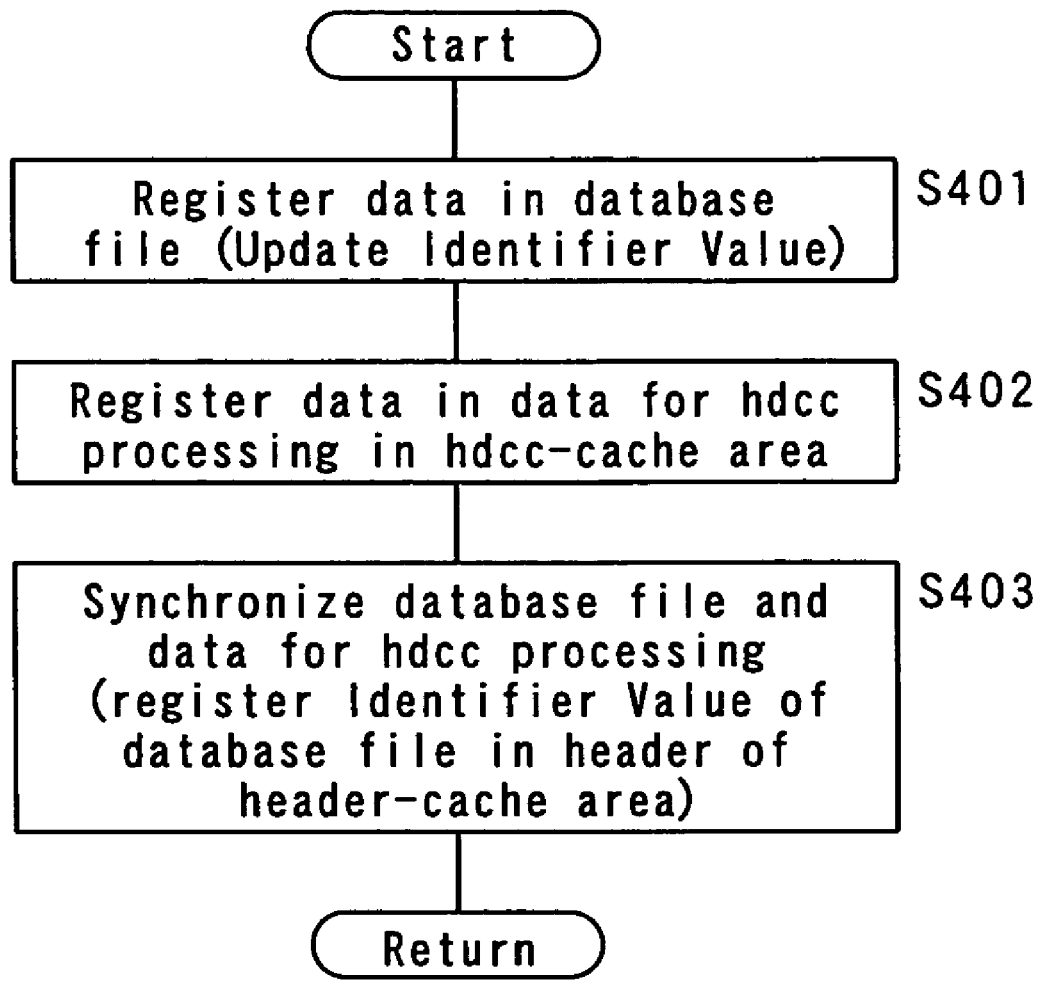
FIG. 8 is a flowchart showing the registration processing as processing for database caching.

FIG. 8 shows the flow of the registration processing in the form of a flowchart.

When the management state for the contents data is changed as described above, a command instructing the execution of the registration processing is issued. Responsive to this command, data is registered by the processing in a step S401 in the database file FL1, such as to reflect the contents of the ongoing change in the management state of the contents data. Meanwhile, this data registration is accompanied by the updating of the Identifier Value stored in the database file FL1. In this case, the time and date information pertaining to the data registration is set as the Identifier value by the processing of step S401.

In the next step S402, data registration for the data for hdcc processing, currently unfolded in the hdcc-cache area 20A, is carried out in similar manner such as to reflect the contents of the ongoing change in the management state of the contents data.

That is, if, in the present embodiment, the registration processing for the database module 34 is to be carried out responsive to a change in the management state of the contents data, the registration processing is carried out such as to reflect the contents of the change in the data for hdcc processing FL2a as saved in the hdcc-cache area 20A.

In this manner, the information contents of the data for hdcc processing FL2a may be matched at all times to the contents of registration in the database file FL1. Stated differently, there is no necessity for collecting the information from the database file FL1 each time the database file FL1 is changed, for matching the data for hdcc processing FL2a to the database file, in formulating the data for hdcc processing FL2a. That is, the processing (step S402) for synchronizing the effective information contents of the data for hdcc processing FL2a with those of the database file FL1 may be of short duration and light load.

In the next step S403, the Identifier Value of the header information FL3, currently held in the header-cache area 20B, is rewritten (registered) so as to be the same as the Identifier Value of the database file FL1, updated by the processing of the previous step S401.

By this processing of a step S403, the Identifier Value stored in the database file FL1 is the same as the Identifier Value stored in the header information FL3 in the header-cache area 20B.

This processing of this step S403 is the preparatory processing for allowing recognition that the database file FL1 is synchronized with the data for hdcc processing FL2a (cache file).

Figure 9:
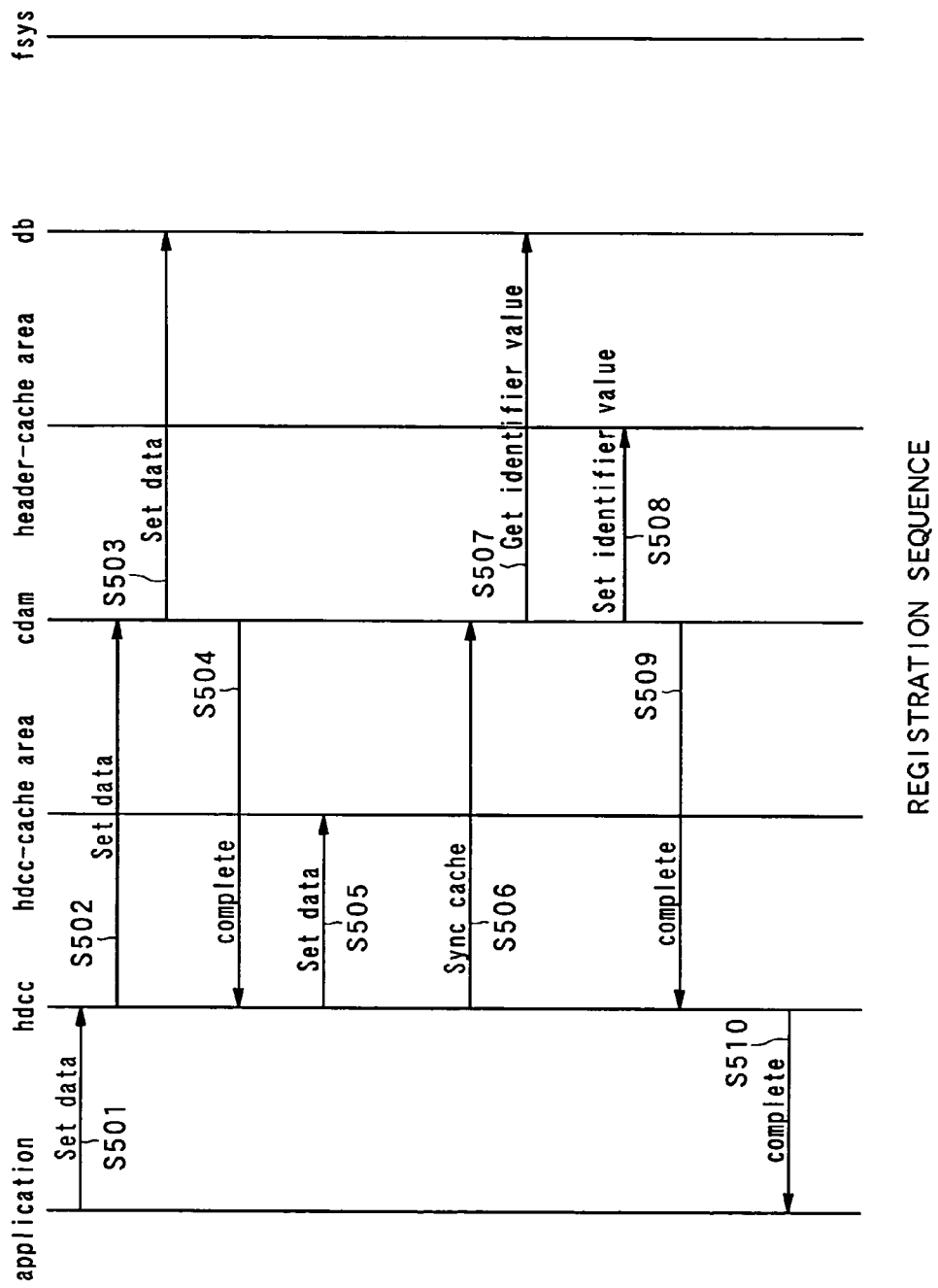
FIG. 9 is an arrow chart showing the sequence of the initializing processing under a program structure shown in FIG. 3.

The sequence of the above registration processing, based on the program structure shown in FIG. 3, is as shown in FIG. 9.

First of all, in FIG. 9, a command (Set data) instructing the data registration for the database file FL1 is issued, by the processing of a step S501, from the application 31 to the hdcc 32. The hdcc 32 is responsive to this command to issue a command (Set data) instructing the cdam 33 to register data for the database file FL1.

Responsive to the command (Set data), the cdam 33 by the processing of a step S503 issues a command for the database module 34 to control the database module to register data for the database file FL1 stored in the HDD 21. For confirmation sake, the Identifier Value, indicating the date and time of the ongoing registration, is registered at this time.

On completion of the processing for data registration for the database file FL1 by this step S503, the cdam 33 notifies the hdcc 32 of the end of the processing for the data registration by the 'complete' response, as indicated in a step S504.

The processing up to this represents the processing of the step S401 in FIG. 8.

On receipt of the notice of the step S504, the hdcc 32 executes the processing of a step S505 (Set data).

As this processing, data registration for the data for hdcc processing FL2a, currently held in the hdcc-cache area 20A, is carried out. This processing corresponds to the processing of the step S402 in FIG. 8.

The processing downstream of a step S506 is the processing corresponding to the step S403 in FIG. 8.

In this step S506, a command 'Sync cache' is sent from the hdcc 32 to the cdam 33. First, the cdam 33 executes, as the processing corresponding to this command, the processing of causing the database module 34 to read out and acquire the Identifier Value of the database file FL1, stored in the HDD 21, as indicated in a step S507. The Identifier Value, acquired here, is the latest value indicating the update time and date corresponding to that in the registration processing in the previous step S503.

In the processing of the next step S508, the value of the Identifier Value acquired is set for an area of the Identifier Value of the header information FL3 held by the header-cache area 20B. In this manner, the Identifier Value of the database file FL1 is of the same value as the Identifier Value of the header information FL3 of the header-cache area 20B.

On completion of the processing of the step S508, the cdam 33 returns 'complete' as a response to a command 'Sync cache' of the step S506, by way of performing the processing of the step S509. That is, the cdam 33 notifies that the processing responsive to the Sync cache command has come to a close. On receipt of the command Set data by the step S501, the hdcc 32 returns 'complete' to the application 31, by way of performing the processing of the step S510.

8. End Processing

The end processing in the database caching of the present embodiment is now explained. The end processing is carried out when the application 31 comes to a close.

The application 31 comes to a close e.g. when the main power supply is turned off as the application 31 is running. The application 31 also comes to a close, even if the main power supply is on, e.g. when the end of the running state of the application 31 is commanded by the user operation or when the application is switched as by activating another application from the application 31.

Figure 10:
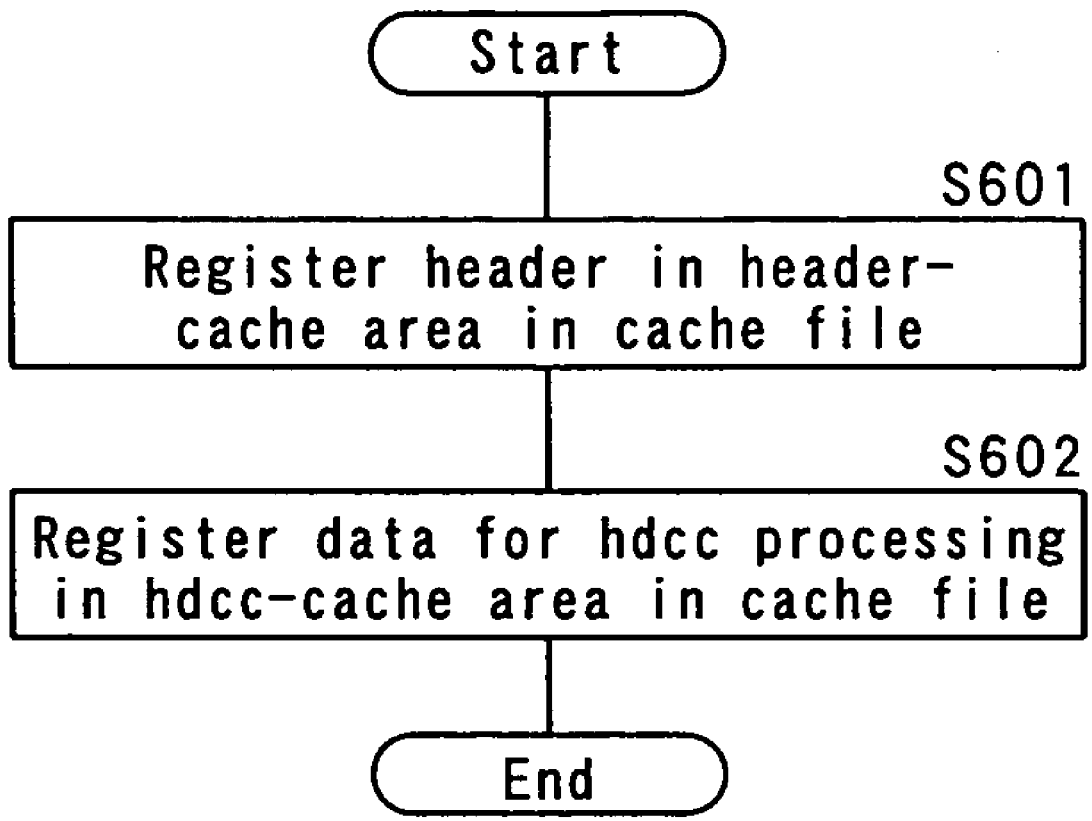
FIG. 10 is a flowchart showing the end processing as processing for database caching.

FIG. 10 shows the end processing by a flowchart. If, with the end of the application 31, a command instructing the end is issued, the end processing shown in FIG. 10 is commenced.

First, in a step S601, the header information FL3, currently unfolded in the header-cache area 20B, is registered as the information of the header area in the file FL2 for hdcc processing (cache file) stored in the HDD 21. Meanwhile, with this processing, the header information FL3, so far unfolded in the header-cache area 20B, may be cleared.

In the next step S602, the data for hdcc processing, so far unfolded in the hdcc-cache area 20A, is registered as the image data in the file FL2 for hdcc processing (cache file) stored in the HDD 21. Meanwhile, the data for hdcc processing, so far unfolded in the hdcc-cache area 20A, may also be cleared with the processing of the step S602.

The end processing, shown as the processing sequence under the program configuration shown in FIG. 3, is as shown in FIG. 11.

In FIG. 11, a command 'terminate' instructing the execution of the end processing is issued from the application 31 to the hdcc 32, by way of performing the processing in a step S701.

Responsive to this command 'terminate', the hdcc 32 performs the processing of a step S702 to acquire the data for hdcc processing FL2a from the hdcc-cache area 20A.

By the processing of the next step S703, the hdcc 32 issues a command Save cache to the cdam 33 instructing the saving of the cache file (file FL2 for hdcc processing).

Responsive to the command Save cache, the cdam 33 performs the processing of a step S704 to acquire the header information FL3 held in the header-cache area 20B. This acquires the data for hdcc processing FL2a and the header information FL3.

The cdam 33 then performs the processing of the next step S705 to command the file system 35 to register the header information FL3 and the data for hdcc processing FL2a as the information of the header area and the data image of the file FL2 for hdcc processing, stored in the HDD 21, and as the data image, respectively, by way of performing the saving processing.

When the processing of the step S705 is completed, the cdam 33 performs the processing of a step S706 to notify the hdcc 32 of the end of the processing of Save cache by the response 'complete'.

On receipt of this notification, the hdcc 32 performs the processing of a step S707 to notify the application 31 of the end of the processing for the 'terminate' command issued by the step S701 by the response 'complete'.

By the processing shown in FIGS. 10 and 11, the information of the header area of the file FL2 for hdcc processing and the data image are updated, at the time of end of the application, by the file FL2 for hdcc processing, so far saved in the hdcc-cache area 20A, and the header information FL3 saved in the header-cache area 20B.

Meanwhile, in FIG. 10, the header information FL3 in the header-cache area 20B is registered in the cache file (file FL2 for hdcc processing) and the data for hdcc processing FL2a in the hdcc-cache area 20A is then registered in the cache file (file FL2 for hdcc processing).

The processing shown in FIG. 11 acquires the information in the sequence of the data for hdcc processing FL2a of the hdcc-cache area 20A and the header information FL3 of the header-cache area 20B and subsequently registers the two in a lump in the cache file (file FL2 for hdcc processing) and thus differs slightly from the processing shown in FIG. 12.

However, in the present embodiment, it is sufficient if ultimately the file FL2 for hdcc processing is updated by the data for hdcc processing FL2a of the hdcc-cache area 20A and by the header information FL3 of the header-cache area 20B, while the processing sequence for achieving this may be changed as desired. The same may be said of the initializing processing and the registration processing.

As for the data contents of the file FL2 for hdcc processing (cache file) on the HDD 21, updated by the end processing as described above, the following remarks may be made.

First, the image data has been updated by the data for hdcc processing FL2a. The data for hdcc processing FL2a is of the information contents synchronized at all times with the registration contents of the database file FL1, if only the previous registration processing was executed as normally. Hence, the contents of the image data following the end processing are synchronized with the registration contents of the database file FL1.

On the other hand, the header area is updated by the header information FL3 of the header-cache area 20B. The Identifier Value stored in the header information FL3 is of the same value as the Identifier Value of the database file FL1 at all times, as may be understood from the previous explanation on the registration processing. Consequently, the Identifier Value stored in the data for hdcc processing FL2a (cache file) after the end processing should be coincident with the Identifier Value in the database file FL1.

That is, the file FL2 for hdcc processing, saved in the HDD 21 after the end processing, has the contents synchronized with the registration contents of the current database file FL1 as the data image (data for hdcc processing). Thus, it may be understood that, in initializing the data for hdcc processing FL2a, the data image of the file FL2 for hdcc processing may directly be used, as already explained with reference to FIGS. 5 and 6.

In addition, as also described in the foregoing, the Identifier Value of the file FL2 for hdcc processing, saved in the HDD 21 after the end processing, is coincident with the Identifier Value of the database file FL1, as long as the various processing operations for database caching, such as initializing processing, registration processing or end processing, are carried out as regularly. This means that, if the Identifier Values of the two coincide with each other, the data image of the file FL2 for hdcc processing (data for hdcc processing) may be deemed to be matched to the contents of registration of the database file FL1.

If conversely the two Identifier Values are not coincident with each other, the risk is presumably high that some error has occurred in the course of execution of the data image caching such that the data image of the file FL2 for hdcc processing (data for hdcc processing) has ceased to be matched to the contents of registration of the database file FL1.

It is based on the foregoing that a decision on whether or not synchronization has been achieved in the initializing processing explained with reference to FIGS. 5 to 7 is given by comparing the Identifier Values to each other.

The foregoing explanation has been made on the presumption that it is the program run by the CPU 11 that realizes the operation of the above embodiment as the present invention. This program is stored by being installed in e.g, the HDD 21 or in the ROM 13.

Alternatively, the program may be transiently or permanently stored (recorded) on a removable recording medium, such as a flexible disc, a CD-ROM (Compact Disc Read-Only Memory), an MO (Magneto-Optical) disc, a DVD (Digital Versatile Disc), a magnetic disc or a semiconductor memory. This removable recording medium may be supplied as a so-called package software.

For example, in the present embodiment, a program may be recorded on a medium coped with by the medium drive 19 and provided as the package software. Thus, with the recording and/or reproducing apparatus 1, a program may be read out from the recording medium by the medium drive 19 and installed by storage in the HDD 21 or in the ROM 13. Moreover, with this package medium, the program of the system embodying the present invention may be installed on e.g. a general personal computer.

The program may also be downloaded over a network, such as the Internet, from a server holding the program, in addition to being installed from the removable recording medium, as described above.

It may also be contemplated to construct an update program for adding the function proper to the present invention later to distribute the update program as the package medium or on the network. It is sufficient for the user to acquire the update program in an environment where the preexisting system has been installed.

The present invention is not limited to the above-described structure and may comprise a large variety of modifications.

For example, although the Identifier Value as the synchronization information is stored in the present embodiment for the file FL2 for hdcc processing stored in the HDD 21, it may also be contemplated to save the Identifier Value as the synchronization information on the HDD 21 as another data file independent of the file FL2 for hdcc processing. That is, the second non-volatile storage means and the third non-volatile storage means may be separated from each other or arranged common as the hardware components.

It is however more desirable that the second and third non-volatile storage means are arranged common as a sole data file, having stored therein the Identifier Value as the synchronization information, for the file FL2 for hdcc processing, because data management may thereby be simplified with advantage.

The hdcc cache area 20A in which to store the data for hdcc processing FL2a and the header-cache area 20B in which to store the header information FL3 are provided common in the RAM 20. However, these areas may also be set in the memory devices as distinct hardware devices, or in the memory area common as the hardware device.

The same may be said of the database file FL1 and the file FL2 for hdcc processing, stored in the HDD 21, such that these may be stored in plural HDDs as storage devices distinct as hardware devices.

That is, the first and second information holding means in the present invention may be respective different storage devices or arranged as a common device. The same may be said of the first to third non-volatile storage means.

The hdcc cache area 20A in which to store the data for hdcc processing FL2a and the header-cache area 20B in which to store the header information FL3 are stated to be volatile storage areas, that is, RAMs. However, these may also be non-volatile areas. That is, the system operation of the database caching which is the same as that of the above-described embodiment may be obtained by overwriting the header information FL3 and the data for hdcc processing FL2a stored in the non-volatile area by the data image and the information of the header area forming the file FL2 for hdcc processing at the time of the initializing processing.

The site for storage of the contents data, database file FL1 and the cache file (file FL2 for hdcc processing) is also not limited to the HDD and may be optional non-volatile storage devices or recording mediums.

According to the present invention, it may be contemplated to enable the check carried out at the time of initialization for whether or not matching has been achieved even during the time the application 31 is running. In such case, end processing shown in FIGS. 10 and 11, that is, the processing of updating the file FL2 for hdcc processing by the registration of the data for hdcc processing FL2a and the header information FL3, is carried out at a preset opportunity or timing during the time of running of the application 31.

It is sufficient that e.g. the processing of the steps S101→S102→S103 of FIG. 5 shall be carried out at a preset opportunity or timing during the time of running of the application 31. If the affirmative result has been obtained in the processing of step S103, it is sufficient that the data for hdcc processing FL2a continues to be saved without executing any processing. If conversely the negative result has been obtained, it is sufficient that the processing of the step S105→S106 shall be carried out at a preset opportunity in order to re-synchronize the data for hdcc processing FL2a with the database file FL1.

In the above-described embodiment, the data for hdcc processing FL2a, utilized by the application adapted to cope with the contents, is the list data needed for list display of contents. This, however, is not limitative of the present invention. That is, it is only sufficient that the data for hdcc processing shall be the information obtained by exploiting or referencing the information of the data file, and the information that may be used by the application for contents management and reproduction.

Moreover, in the above-described embodiment, the information processing for the present invention is carried out by the recording and/or reproducing apparatus 1 configured as shown in FIG. 1. However, the configuration of the recording and/or reproducing apparatus may also be optionally modified. For example, the information processing apparatus according to the present invention may be formed e.g. by a personal computer.

Additionally, the contents data supervised by the database need not be limited to the audio data file, but may, for example, be video data.

What is claimed is:

1. An information processing apparatus comprising:
    non-volatile storage means for storage of a database supervising contents data stored in a recording medium;
    first registration means for carrying out a registration process with said database;
    information holding means for holding contents processing data formulated using predetermined information of information forming said database and used for predetermined processing for said contents data;
    contents processing means for carrying out said predetermined processing for said contents data using the contents processing data;
    second registration means for carrying out registration processing for said contents processing data, wherein said second registration means operates in response to results of the processing carried out by said contents processing means to execute the registration processing for said contents processing data in keeping with results of the processing when the registration processing for said database by said first registration means is executed;
    wherein said non-volatile storage means comprises first non-volatile storage means and storage control means;
    said storage control means for operating in response to an end of the processing booted as said contents processing means to store the contents processing data held by said first information holding means on second non-volatile storage means;
    matching information processing means for storing and processing matching information, said matching information processing means operating so that, when the processing for registration for said database by said first registration means and the processing for registration for said contents processing data by said second registration means are carried out in response to the results of processing carried out by said contents processing means, matching information indicating the matching of the contents of registration of said database and the contents processing data is stored for said contents data and saved by information holding means; and
    wherein said storage control means stores said matching information held by said information holding means into third non-volatile storage means.

2. The information processing apparatus according to claim 1, wherein said third non-volatile storage means and said second non-volatile storage means have the same storage area; and wherein
    said storage control means causes said unit data process information and said matching information to be stored in said same storage area in such a manner as to form a file including said contents processing data and said matching information.

3. The information processing apparatus according to claim 1, further comprising:
    decision means for verifying whether the contents of registration of the contents processing data stored in said second non-volatile storage means and the contents of registration of said database are matched to each other, based on said matching information stored in said third non-volatile storage means and on said matching information stored in said database.

4. The information processing apparatus according to claim 3 further comprising:
    initializing means which, in case the contents processing data is initialized and the result of decision that said registration contents are matched is obtained by said decision means, causes the contents processing data in said second non-volatile storage means to be saved in said information holding means.

5. The information processing apparatus according to claim 3 further comprising:
    initializing means which, in case the contents processing data is initialized and the result of decision that said registration contents are not matched is obtained by said decision means, formulates said contents processing data, using the database stored in said first non-volatile storage means, and causes the so formulated contents processing data to be saved by said information holding means.

6. An information processing method comprising the steps of:
   first registration processing for executing a registration processing for a database that is information supervising contents data stored in a recording medium and that is stored in a non-volatile storage area;
   processing for contents data for carrying out a required processing for said contents data, using contents processing data saved in an information holding area, said contents processing data being information formulated using predetermined information of information forming said database and utilized in a required processing for said contents data; and
   second registration processing for executing the registration processing for said contents processing data,
   wherein in case the registration processing for said database by said first registration processing is carried out in response to results of processing as said processing for said contents data, said second registration processing executes the registration processing for said contents processing data in keeping with said results of processing;
   wherein said non-volatile storage area comprises a first non-volatile storage area and a storage control area; said storage control area for operating in response to an end of the processing booted to store the contents processing data held by said first information holding area on a second non-volatile storage area;
   storing and processing matching information, so that when the processing for registration for said database in said first registration processing step and the processing for registration for said contents processing data in said second registration processing step are carried out in response to the results of processing carried out in said contents processing step, matching information indicating the matching of the contents of registration of said database and the contents processing data is stored for said contents data and held in the information holding area; and
   wherein said storage control area stores said matching information held in said information holding area into a third non-volatile storage area.

7. A computer program product for information processing, comprising the steps of:
   first registration processing for executing a registration processing for a database that is information supervising contents data stored in a recording medium and that is stored in a non-volatile storage area;
   processing for contents data for carrying out a required processing for said contents data, using contents processing data held in an information holding area, said contents processing data being information formulated using predetermined information of information forming said database and utilized in a required processing for said contents data; and
   second registration processing for executing the registration processing for said contents processing data,
   wherein in case the registration processing for said database by said first registration processing is carried out in response to results of processing as said processing for said contents data, said second registration processing executes the registration processing for said contents processing data in keeping with said results of processing;
   wherein said non-volatile storage area comprises a first non-volatile storage area and a storage control area; said storage control area for operating in response to an end of the processing booted to store the contents processing data held by said first information holding area on a second non-volatile storage area;
   storing and processing matching information, so that when the processing for registration for said database in said first registration processing step and the processing for registration for said contents processing data in said second registration processing step are carried out in response to the results of processing carried out in said contents processing step, matching information indicating the matching of the contents of registration of said database and the contents processing data is stored for said contents data and held in the information holding area; and
   wherein said storage control area stores said matching information held in said information holding area into a third non-volatile storage area.

8. A recording medium having recorded thereon a program executed on an information processing apparatus, comprising the steps of:
   first registration processing for executing a registration processing for a database that is the information supervising contents data stored in a recording medium and that is stored in a non-volatile storage area;
   processing for contents data for carrying out required processing for said contents data using contents processing data held in an information holding area, said contents processing data being information formulated using predetermined information of information forming said database and utilized in a required processing for said contents data; and
   second registration processing for executing the registration processing for said contents processing data,
   wherein in case the registration processing for said database by said first registration processing is carried out in response to results of processing as said processing for said contents data, said second registration processing executes the registration processing for said contents processing data in keeping with said results of processing;
   wherein said non-volatile storage area comprises a first non-volatile storage area and a storage control area; said storage control area for operating in response to an end of the processing booted to store the contents processing data held by said first information holding area on a second non-volatile storage area;
   storing and processing matching information, so that when the processing for registration for said database in said first registration processing step and the processing for registration for said contents processing data in said second registration processing step are carried out in response to the results of processing carried out in said contents processing step, matching information indicating the matching of the contents of registration of said database and the contents processing data is stored for said contents data and held in the information holding area; and
   wherein said storage control area stores said matching information held in said information holding area into a third non-volatile storage area.

* * * * *